(12) United States Patent
Shah et al.

(10) Patent No.: US 12,536,603 B2
(45) Date of Patent: Jan. 27, 2026

(54) METHOD AND SYSTEM FOR REGRESSION BASED PREDICTION OF ABERRANT BEHAVIOUR IN ONLINE PROCTORING

(71) Applicant: Tata Consultancy Services Limited, Mumbai (IN)

(72) Inventors: Viral Prakash Shah, Thane West (IN); Manish Rawat, Thane West (IN); Fardeen Khan, Thane West (IN); Rishi Setiya, Thane West (IN); Naveen Vaishnav, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 165 days.

(21) Appl. No.: 18/407,216

(22) Filed: Jan. 8, 2024

(65) Prior Publication Data
US 2024/0273661 A1 Aug. 15, 2024

(30) Foreign Application Priority Data
Feb. 10, 2023 (IN) .............................. 202321008607

(51) Int. Cl.
*G06Q 50/20* (2012.01)
(52) U.S. Cl.
CPC .................................. *G06Q 50/205* (2013.01)
(58) Field of Classification Search
CPC ................................................... G06Q 50/205
See application file for complete search history.

(56) References Cited

U.S. PATENT DOCUMENTS

| | | | |
|---|---|---|---|
| 2003/0149586 A1* | 8/2003 | Chen ....................... | G06F 16/35 705/400 |
| 2019/0228288 A1* | 7/2019 | Siddiqui .................. | G06N 5/01 |

(Continued)

FOREIGN PATENT DOCUMENTS

| | | |
|---|---|---|
| CN | 114743137 A | 7/2022 |
| KR | 20220142681 A | 10/2022 |

OTHER PUBLICATIONS

Atoum, Yousef et al., "Automated Online Exam Proctoring", Title of the item: IEEE Transactions on Multimedia, Date: 2017, Publisher: IEEE, Link: http://cvlab.cse.msu.edu/pdfs/Atoum_Chen_Liu_Hsu_Liu_OEP.pdf.

*Primary Examiner* — Jensen Hu
(74) *Attorney, Agent, or Firm* — Finnegan, Henderson, Farabow, Garrett & Dunner, LLP

(57) ABSTRACT

Examinations are used to determine the ability of a candidate such as a student or prospective practitioner as it pertains to proficiency in a particular subject or skill set. Many standardized tests are now administered online, and online examinations are difficult to proctor. One solution to overcome the above challenge is to predict the behaviour of the candidate using Machine Learning (ML). However, conventional ML based methods fail to consider sequence of incidents pertaining to a candidate during online proctoring for assessing the behavior of the candidate. To overcome the above challenges, embodiments herein provide a method and system for regression based prediction of aberrant behavior in online proctoring. The present disclosure generally concerns with exam proctoring and more specifically focus on detecting of aberrant behaviors in advance during examination by analyzing a plurality of incidents pertaining to a candidate using incident tree based regression analysis.

14 Claims, 6 Drawing Sheets

(56) References Cited

U.S. PATENT DOCUMENTS

| | | | |
|---|---|---|---|
| 2019/0325770 A1* | 10/2019 | Foster | G06Q 10/06315 |
| 2020/0111379 A1 | 4/2020 | Cui | |
| 2021/0304339 A1 | 9/2021 | Neelakanta | |
| 2022/0172482 A1* | 6/2022 | Yunger | G06V 20/52 |
| 2022/0392226 A1* | 12/2022 | Li | G06V 40/20 |
| 2023/0186106 A1* | 6/2023 | Valdes | G06N 5/01 |
| | | | 706/46 |

* cited by examiner

METHOD AND SYSTEM FOR REGRESSION BASED PREDICTION OF ABERRANT BEHAVIOUR IN ONLINE PROCTORING

PRIORITY CLAIM

This U.S. patent application claims priority under 35 U.S.C. § 119 to: Indian Patent Application No. 202321008607, filed on Feb. 10, 2023. The entire contents of the aforementioned application are incorporated herein by reference.

TECHNICAL FIELD

The disclosure herein generally relates to the field of proctored examinations and, more particularly, to a method and system for regression based prediction of aberrant behavior in online proctoring.

BACKGROUND

Examinations are used to identify whether a candidate has enough proficiency in a particular subject or skill set. Many standardized examinations are now administered via computer rather than paper-and-pencil format. Proctoring an online exam is challenging since the possibility for doing malpractice is more since there is no direct face to face connect between the proctor and the examinees. Hence the value of online examinations is therefore questionable. One solution to overcome the above challenge is to predict behaviour of the candidate using Machine Learning (ML) approach. The ML based systems automatically learn and improve from experience without being explicitly programmed. Further, data analysis techniques can be used to continuously compare the input data with the raw data and analyzing future incidents making decisions based on it.

Most of the conventional ML based methods compare pre-defined parameters with extracted user parameters and determine whether it violates an assessment criterion. Some other ML models concentrate on some limited parameters for comparison and don't provide a holistic analysis considering all possible parameters to predict aberrant behavior of candidates during online proctoring.

SUMMARY

Embodiments of the present disclosure present technological improvements as solutions to one or more of the above-mentioned technical problems recognized by the inventors in conventional systems. For example, in one embodiment, a method for Regression based prediction of aberrant behavior in online proctoring is provided. The method includes receiving, by one or more hardware processors, a proctoring data pertaining to each of a plurality of users from a plurality of local instances. Further, the method includes classifying, by the one or more hardware processors, the proctoring data pertaining to each of the plurality of users based on a type of information associated with the proctoring data, using a classification technique. Furthermore, the method includes generating, by the one or more hardware processors, a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes. Furthermore, the method includes computing, by the one or more hardware processors, a weighted sum (X) by adding a plurality of weights associated with the weighted incident tree. Furthermore, the method includes computing, by the one or more hardware processors, a dynamic path score (Y) based on a length of the weighted incident tree, a confirmation percentage, and an assessment constant. Furthermore, the method includes computing, by the one or more hardware processors, an incident path matching value (b) based on a comparison between the weighted incident tree and a plurality of historic weighted incident trees stored in the command center, wherein the incident path matching value is computed based on one of a) a complete path match, and b) a partial path match. Furthermore, the method includes predicting, by the one or more hardware processors, a final score for each of the plurality of users based on the weighted sum (X), the dynamic path score (Y), an assessment type value (a) and an incident path matching value (b) using an incident tree based regression technique. Finally, the method includes predicting, by the one or more hardware processors, an aberrant behaviour of each of the plurality of users based on a comparison between an associated final score and a plurality of predefined thresholds.

In another aspect, a system for Regression based prediction of aberrant behavior in online proctoring is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a proctoring data pertaining to each of a plurality of users from a plurality of local instances. Further, the one or more hardware processors are configured by the programmed instructions to classify the proctoring data pertaining to each of the plurality of users based on a type of information associated with the proctoring data, using a classification technique. Furthermore, the one or more hardware processors are configured by the programmed instructions to generate a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes. Furthermore, the one or more hardware processors are configured by the programmed instructions to compute a weighted sum (X) by adding a plurality of weights associated with the weighted incident tree. Furthermore, the one or more hardware processors are configured by the programmed instructions to compute a dynamic path score (Y) based on a length of the weighted incident tree, a confirmation percentage, and an assessment constant. Furthermore, the one or more hardware processors are configured by the programmed instructions to compute an incident path matching value (b) based on a comparison between the weighted incident tree and a plurality of historic weighted incident trees stored in the command center, wherein the incident path matching value is computed based on one of a) a complete path match, and b) a partial path match. Furthermore, the one or more hardware processors are configured by the programmed instructions to predict a final score for each of the plurality of users based on the weighted sum (X), the dynamic path score (Y), an assessment type value (a) and an incident path matching value (b) using an incident tree based regression technique. Finally, the one or more hardware processors are configured by the programmed instructions to predict an aberrant behavior of each of the plurality of users based on a comparison between an associated final score and a plurality of predefined thresholds.

In yet another aspect, a computer program product including a non-transitory computer-readable medium having embodied therein a computer program for Regression based prediction of aberrant behavior in online proctoring is provided. The computer readable program, when executed on a computing device, causes the computing device to receive a proctoring data pertaining to each of a plurality of users from a plurality of local instances. Further, the computer readable program, when executed on a computing device, causes the computing device to classify the proctoring data pertaining to each of the plurality of users based on a type of information associated with the proctoring data, using a classification technique. Furthermore, the computer readable program, when executed on a computing device, causes the computing device to generate a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes. Furthermore, the computer readable program, when executed on a computing device, causes the computing device to compute a weighted sum (X) by adding a plurality of weights associated with the weighted incident tree. Furthermore, the computer readable program, when executed on a computing device, causes the computing device to compute a dynamic path score (Y) based on a length of the weighted incident tree, a confirmation percentage, and an assessment constant. Furthermore, the computer readable program, when executed on a computing device, causes the computing device to compute an incident path matching value (b) based on a comparison between the weighted incident tree and a plurality of historic weighted incident trees stored in the command center, wherein the incident path matching value is computed based on one of a) a complete path match, and b) a partial path match. Furthermore, the computer readable program, when executed on a computing device, causes the computing device to predict a final score for each of the plurality of users based on the weighted sum (X), the dynamic path score (Y), an assessment type value (a) and an incident path matching value (b) using an incident tree based regression technique. Finally, the computer readable program, when executed on a computing device, causes the computing device to predict an aberrant behavior of each of the plurality of users based on a comparison between an associated final score and a plurality of predefined thresholds.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
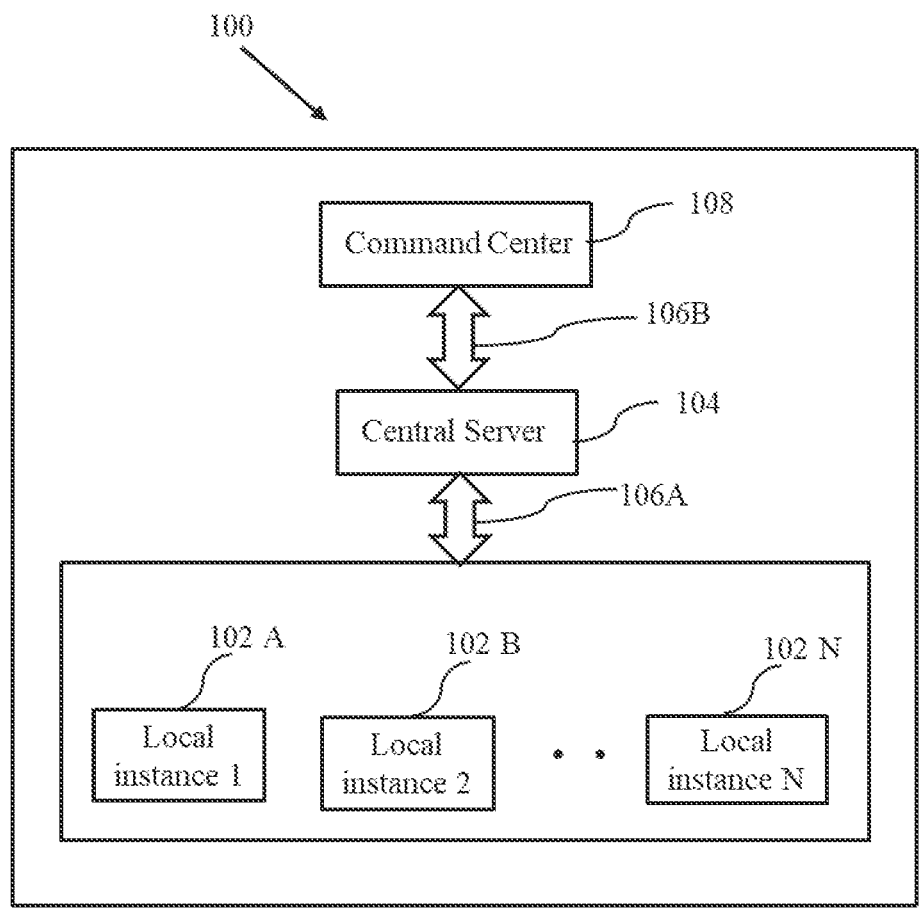
FIG. 1 is a functional block diagram of an online proctoring environment, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Examinations are used to determine the ability of a candidate such as a student or prospective practitioner as it pertains to proficiency in a particular subject or skill set. For example, a student might take a test to determine whether the student possesses requisite knowledge in a particular subject that might be related to receiving a degree or certificate. Many standardized tests are now administered online, and online examinations are difficult to proctor as a candidate could be cheating, like mass cheating, candidate room change or using electronic devices to relay questions to and receive answers from a knowledgeable third-party. Even the invigilators may help the candidates to do cheating. One solution to overcome the above challenge is to predict the behaviour of the candidate using Machine Learning (ML). However, most of the conventional ML based methods compare pre-defined parameters with the extracted user parameters and determines whether it violates the assessment criteria. However, no prior arts are considering a sequence of incidents pertaining to a candidate during online proctoring for assessing the behavior of the candidate.

To overcome the above challenges, embodiments herein provide a method and system for regression based prediction of aberrant behavior in online proctoring. The present disclosure generally concerns with exam proctoring and more specifically focus on detecting of aberrant behaviors in advance during examination by analyzing a plurality of incidents pertaining to a candidate using incident tree based regression analysis. For example, the present disclosure detects activities/suspicious behaviors in the candidate system which cannot be seen by human eye, which leads to cheating in previous exams and if the same activity is observed in the same examination center or different exam center, it would generate immediate alert to the invigilator or to the available ground team, thus preventing malpractice in the examination.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of an online proctoring environment, in accordance with some embodiments of the present disclosure. In an embodiment, the online proctoring environment 100 includes a plurality of local instances 102A, 102B, . . . , 102N, a central server 104, a command center 108 and a plurality of network connections, for example 106A and 106B. The network connection 106A connects each of the corresponding plurality of local instances to the central server 104. Similarly, the network connections 106B connects the central server 104 and the command center 108. In an embodiment, the command center 108 verifies the feedback received from the central server 104 through image capturing devices like Closed Circuit Television (CCTV). In an embodiment, each of the plurality of network connections 106A through 106N is a wired communication network or a wireless communication network.

Figure 2:
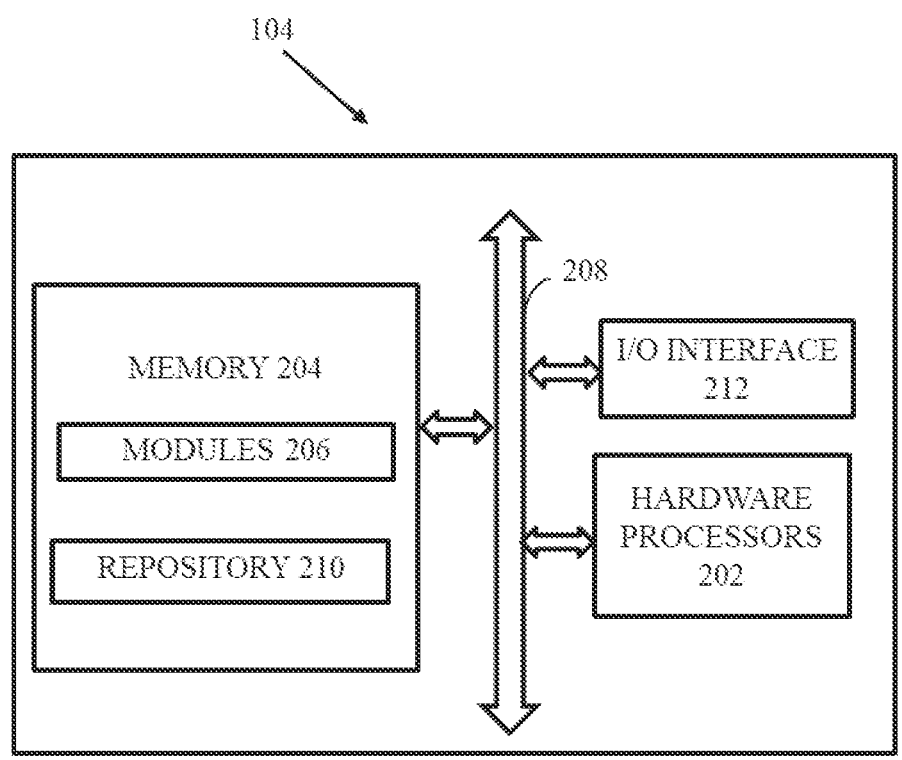
FIG. 2 is a functional block diagram of a central server of FIG. 1, for regression based prediction of aberrant behavior in online proctoring, in accordance with some embodiments of the present disclosure.
Figure 3:
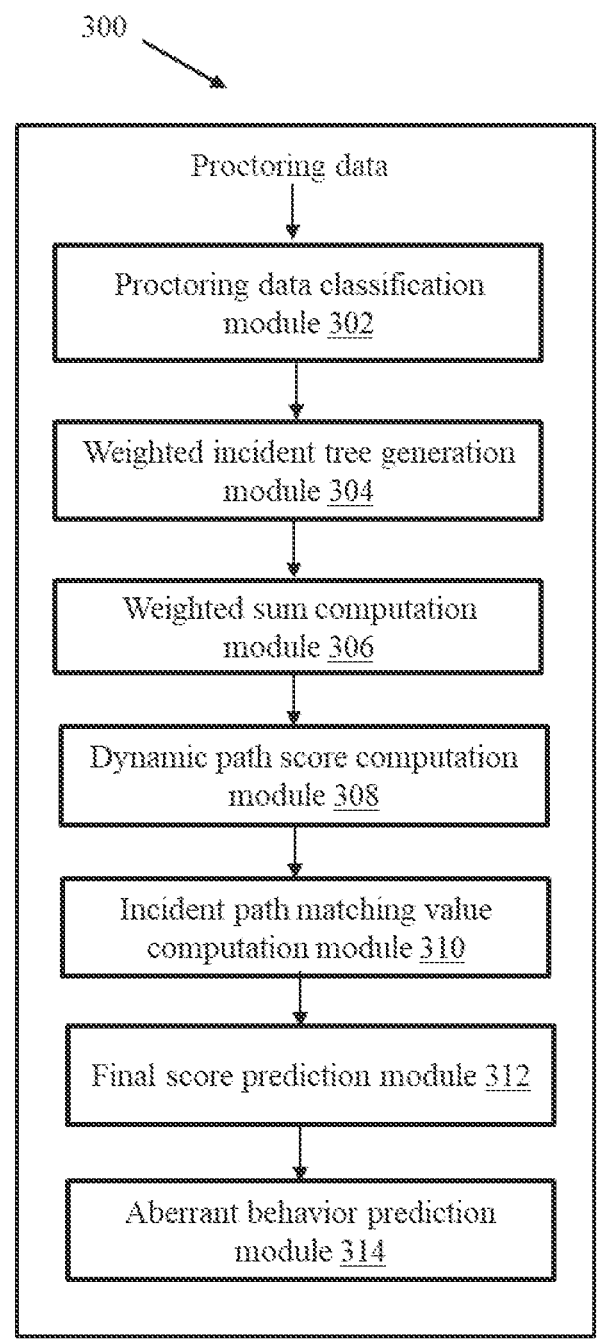
FIG. 3 illustrates a functional architecture of the system of FIG. 1, for the regression based prediction of aberrant behavior in online proctoring, in accordance with some embodiments of the present disclosure.

FIG. 2 is a functional block diagram of a central server of FIG. 1, for regression based prediction of aberrant behavior in online proctoring, in accordance with some embodiments of the present disclosure. In an embodiment, the functional block diagram of the command center, and the plurality of local instances are similar to the functional block diagram 104. The central sever 104 includes or is otherwise in communication with hardware processors 202, at least one memory such as a memory 204, an I/O interface 212. The hardware processors 202, memory 204, and the Input/Output (I/O) interface 212 may be coupled by a system bus such as a system bus 208 or a similar mechanism. In an embodiment, the hardware processors 202 can be one or more hardware processors.

The I/O interface 212 may include a variety of software and hardware interfaces, for example, a web interface, a graphical user interface, and the like. The I/O interface 212 may include a variety of software and hardware interfaces, for example, interfaces for peripheral device(s), such as a keyboard, a mouse, an external memory, a printer and the like. Further, the I/O interface 212 may enable the system 200 to communicate with other devices, such as web servers, and external databases.

The I/O interface 212 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 212 may include one or more ports for connecting several computing systems with one another or to another server computer. The I/O interface 212 may include one or more ports for connecting several devices to one another or to another server.

The one or more hardware processors 202 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 206. The memory 204 also includes a data repository (or repository) 210 for storing data processed, received, and generated by the plurality of modules 206.

The plurality of modules 206 include programs or coded instructions that supplement applications or functions performed by the system 200 for regression based prediction of aberrant behavior in online proctoring. The plurality of modules 206, amongst other things, can include routines, programs, objects, components, and data structures, which performs particular tasks or implement particular abstract data types. The plurality of modules 206 may also be used as, signal processor(s), node machine(s), logic circuitries, and/or any other device or component that manipulates signals based on operational instructions. Further, the plurality of modules 206 can be used by hardware, by computer-readable instructions executed by the one or more hardware processors 202, or by a combination thereof. The plurality of modules 206 can include various sub-modules (not shown). The plurality of modules 206 may include computer-readable instructions that supplement applications or functions performed by the system 200 for regression based prediction of aberrant behavior in online proctoring. In an embodiment, the plurality of modules 206 include a proctoring data classification module (shown in FIG. 3), a weighted incident tree generation module (shown in FIG. 3), a weighted sum computation module (shown in FIG. 3), a dynamic path score computation module (shown in FIG. 3), an incident path matching value computation module (shown in FIG. 3), a final score prediction module (shown in FIG. 3) and an aberrant behavior prediction module (shown in FIG. 3).

The data repository (or repository) 210 may include a plurality of abstracted piece of code for refinement and data that is processed, received, or generated as a result of the execution of the plurality of modules in the module(s) 206.

Although the data repository 210 is shown internal to the system 200, it will be noted that, in alternate embodiments, the data repository 210 can also be implemented external to the system 200, where the data repository 210 may be stored within a database (repository 210) communicatively coupled to the system 200. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 4A and FIG. 4B.

Figure 4A:
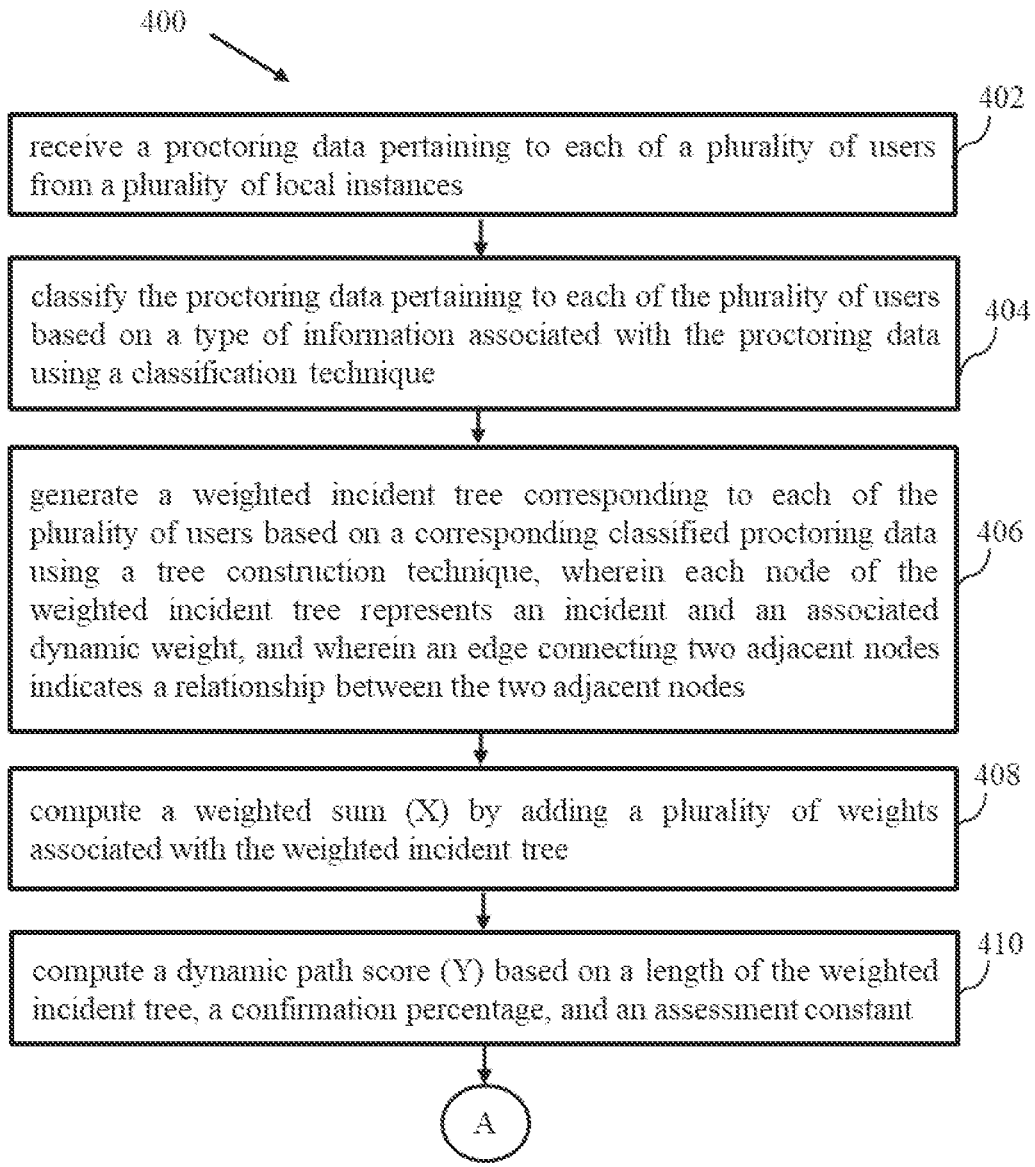
FIGS. 4A and 4B are exemplary flow diagrams illustrating a processor implemented method 400 for the regression based prediction of aberrant behavior in online proctoring implemented by the central server of FIG. 2, according to some embodiments of the present disclosure.
Figure 4B:
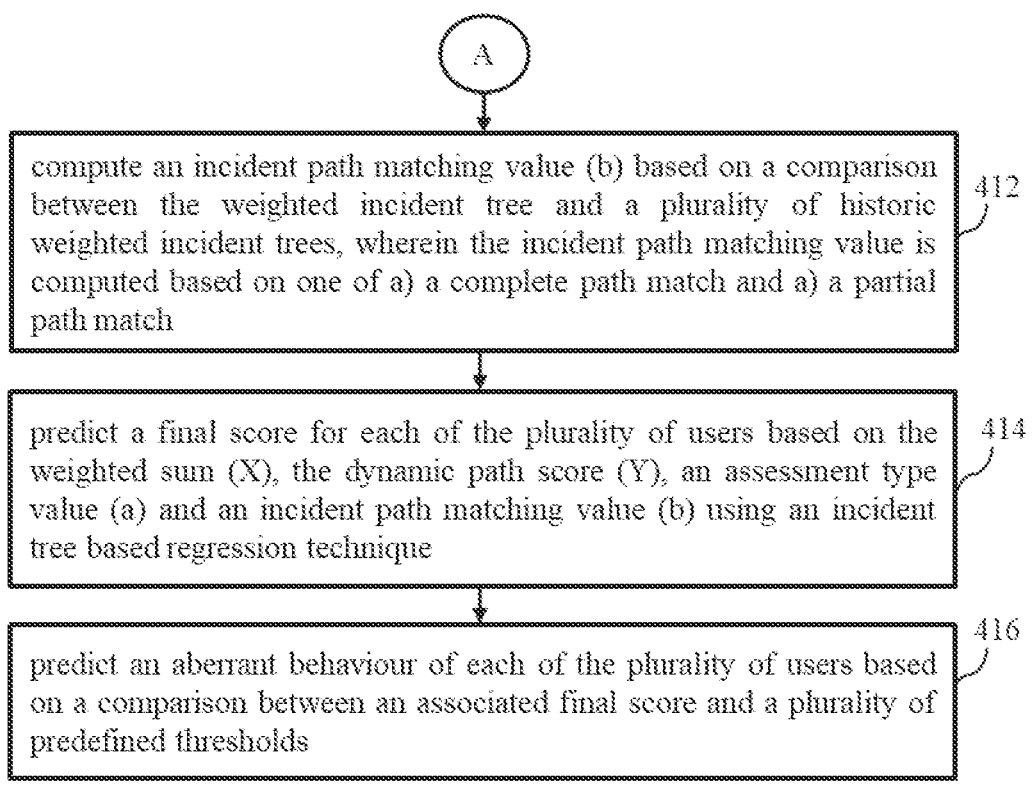

FIG. 4A and FIG. 4B (collectively referred to as FIG. 4) is an exemplary flow diagram illustrating a method 400 for regression based prediction of aberrant behavior in online proctoring implemented by the central server of FIG. 2 according to some embodiments of the present disclosure.

In an embodiment, the system 200 (central server) includes one or more data storage devices or the memory 204 operatively coupled to the one or more hardware processor(s) 202 and is configured to store instructions for execution of steps of the method 400 by the one or more hardware processors 202. The steps of the method 400 of the present disclosure will now be explained with reference to the components or blocks of the system 100 and the system 200 as depicted in FIGS. 1 and 2 and the steps of flow diagram as depicted in FIG. 4. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof.

At step 402 of the method 400, the one or more hardware processors 202 of the central server are configured by the programmed instructions to receive a proctoring data pertaining to each of a plurality of users from the plurality of local instances 102A . . . 102N, wherein the proctoring data is received at specific intervals (predefined or dynamically configured) or in real time. The proctoring data includes a plurality of incidents obtained based on video footage, a plurality signal information including Radio Frequency and Bluetooth, a response behavior of the plurality of candidates, external devices like keyboard, screen behavior, and system reallocation without any valid reason. For example, if a system is reallocated for a candidate if there is any system fault or network issues, then it is considered as valid and invalid otherwise. Various such actions may be classified as valid or invalid, and maybe configured with the system as reference data.

In an embodiment, the exam questions data is communicated to the plurality of local instances 102A . . . 102N present in online examination centers. A candidate may attempt the examination by entering the response to the question data displayed on a display screen of the Local Instance. Once the candidate begins responding to the question data display on the screen of a corresponding local instance, the capturing of the proctoring data or incidence, including face mismatch, Detection of RF devices, Wi-Fi detected at regular time interval begins at the plurality of local instances 102A . . . 102N.

A plurality of example incidents and abbreviation used in the present disclosure are illustrated in Table I. Now referring to Table 1, "Wi-Fi device detected" means, the candidate is using a Wi-Fi device which means, the candidate is referring internet. "Radio Frequency (RF) data detected by the launcher" incident is raised when RF Data signals detected by the launcher in candidate systems as this might lead to malpractice. "Internet Detected By Launcher" means there is no internet enablement in the exam centers for candidate machines and they are connected to corresponding central server only via LAN. This incident is raised when internet connectivity is detected by launcher in the candidate systems which might be a possible threat of malpractice. "Room change done in Multi-Exam" is raised when candidate room is different from the allocated during this Multi-Exam. "Room" changed detected" is raised when candidate room different from the allocated is detected during the assessment. "CCTV tampering detected" may indicate a criminal act is occurring. Common examples of camera tampering are turning the camera lens to point to a different direction (i.e., camera motion) and covering the lens by opaque objects or with paint. Other incidents mentioned in the Table I are self-explanatory.

TABLE I

| Sl. No | Abbreviation | Real time incidents |
|---|---|---|
| 1 | WFD | Wi-Fi Device Detected |
| 2 | RFD | RF Data Detected By The Launcher |
| 3 | IDL | Internet Detected By Launcher |
| 4 | MHD | Multiple Keyboard/Mouse Detected |
| 5 | DCF | Duplicate Fingerprint While Candidate Registration |
| 6 | AV | Candidates Aadhaar Verification Bypassed |
| 7 | RC | Room change done in Multi-Exam |
| 8 | RC1 | Room changed detected |
| 9 | CL | candidate login from different system |
| 10 | CCTV1 | CCTV tampering detected |
| 11 | CCTV2 | CCTV Person detected talking each other |
| 12 | CCTV3 | CCTV - Staff is not present |

Now referring to FIG. 4, at step 404 of the method 400, the proctoring data classification module 302, executed by one or more hardware processors 202 of the central server, is configured by the programmed instructions to classify the proctoring data pertaining to each of the plurality of users based on a type of information associated with the proctoring data using a classification technique.

For example, the received proctoring data is classified based on the type information like "hardware", "RF" and the like. For example, if there is any malfunctioning of hardware at the candidate end, the central server 104 arrange it according to the type of the data, the level at which incident happened, generate the type id of the incident and the description of the incidence as given in Table II.

TABLE II

| Incident type_id/code | Incident type | Incident level | Incident Description |
|---|---|---|---|
| 23 | Hardware | Candidate Level | Manual incident raised for hardware related issues |
| 45AF | RF | Drive Level | RF Data Detected By The Launcher |

At step 406 of the method 400, the weighted incident tree generation module 304, executed by one or more hardware processors 202 of the central server, is configured by the programmed instructions to generate a weighted incident tree corresponding to each of the plurality of users based on a corresponding classified proctoring data using a tree construction technique. Each node of the weighted incident tree represents an incident and an associated dynamic weight. The dynamic weight is proportional to the accuracy of the aberrant behavior and is updated periodically. Each edge connecting two adjacent nodes indicates a relationship between the two adjacent nodes.

Figure 5:
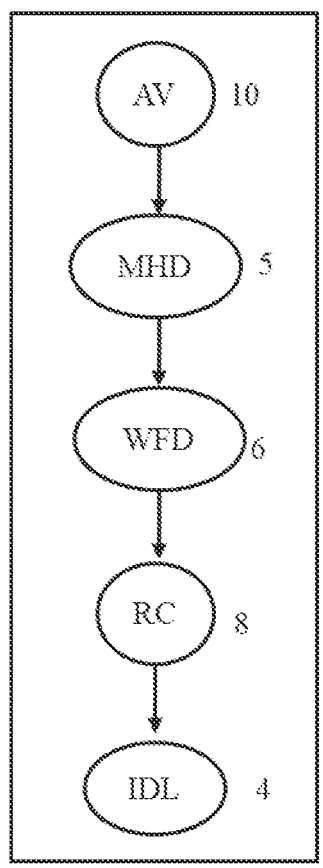
FIG. 5 is an exemplary weighted incident tree for the processor implemented method for regression based prediction of aberrant behavior in online proctoring implemented by the system of FIG. 1 according to some embodiments of the present disclosure.

In an embodiment, an example weighted incident tree pertaining to a candidate undergoing online examination is recorded as shown in FIG. 5. Now referring to FIG. 5, the node "AV" is with a dynamic weight 10, the node "MHD" is having a dynamic weight 5, the node WFD is having a dynamic weight 6, the node "RC" is having a dynamic weight 8 and the node "IDL" is having a dynamic weight of 4. This weighted incident tree records a sequence of incidents pertaining to a candidate like, "Candidates Aadhaar Verification Bypassed-Multiple Keyboard/Mouse Detected- Wifi device detected-Room change done in Multi-Exam-Internet Detected By Launcher".

At step 408 of the method 400, the weighted sum computation module 306, executed by one or more hardware processors 202 of the central server, is configured by the programmed instructions to compute a weighted sum (X) by adding a plurality of dynamic weights associated with the weighted incident tree. For example, considering the weighted incident tree given in FIG. 5, the weighted sum is 10+5+6+8+4=33.

At step 410 of the method 400, the dynamic path score computation module 308, executed by one or more hardware processors 202 of the central server, is configured by the programmed instructions to compute a dynamic path score (Y) based on a length of the weighted incident tree, a confirmation percentage and an assessment constant (value given to each assessment type). For example, the length of the weighted incident tree given in FIG. 5 is 4 (number of edges). The confirmation percentage is computed based on the weighted sum (X), the dynamic path score (Y), an assessment type value (a), an incident path deviation value (b) and a predefined threshold (for example 146) as given in equation (1). Here, 'a' value depends upon the type of assessments like high stake or low stake exams, firstly the value of it is predefined before the first incidences raised and it continue to adjust its value through machine learning techniques depending upon the feedback from the available team present across the examination center. 'b' value (incident path matching value) depends upon the path/sequence of the incidences; it's value also continue to adjust through ML according to the presence/absence of any incidences that is required to compare with the fixed set of incidences available to maintain the balance in the total score.

$$\text{Confirmation percentage} = \left(\frac{aX + bY}{146}\right) * 100 \quad (1)$$

At step 412 of the method 400, incident path matching value computation module 310, executed by one or more hardware processors 202 of the central server, is configured by the programmed instructions to compute the incident path matching value (b) based on a comparison between the weighted incident tree and a plurality of historic weighted incident trees stored in the command center, wherein the incident path matching value is computed based on one of a) a complete path match and a) a partial path match. For example, the path matching value can be a partial match or full match. Now considering the incidence sequence given in FIG. 5 (AV-MHD-WFD-RC-IDL) and a historic aberrant behavior path stored in command server is "AV-MHD-WFD-RC-RFD", then the partial path matching value is '3'. For example, if the input incidence sequence is "DCF-MHD-WFD-RC-IDL" and the historic aberrant sequence is "DCF-MHD-WFD-RC-IDL", then full match is observed and the incident path matching value in this case is 4.

At step 414 of the method 400, the final score prediction module 312, executed by one or more hardware processors 202 of the central server, is configured by the programmed instructions to predict a final score (S) for each of the plurality of users based on the weighted sum (X), the dynamic path score (Y), an assessment type value (a) and an incident path matching value (b), using an incident tree based regression technique using the formula given in equation (2). For example, if the value of a=1.26, b=0.85, then the final score generated is 1.26*33+0.85*50=41.58+42.5=84.08.

$$S = aX + bY \quad (2)$$

At step 416 of the method 400, the aberrant behavior prediction module 314, executed by one or more hardware processors 202 of the central server, is configured by the programmed instructions to predict an aberrant behavior of each of the plurality of users based on a comparison between an associated final score and a plurality of predefined thresholds. For example, If the final score is greater than a high severity threshold (for example 146), then the aberrant behavior is a high severe one. If the final score value lies between a lower severity threshold (for example 98) and the higher severity threshold, then the aberrant behavior is considered as medium severe. If the final score is less than the lower severity threshold, then the severity is considered as less severe. In an embodiment, the high severity is alerted with red color, medium severity is alerted with orange color and low severity is alerted with gray color in the user interface. In an embodiment, the prediction by the central assessment server is verified by a user at the command center and severity alert is generated. In an embodiment, the command center 108 verifies the prediction received from the central server 104 through image capturing devices like CCTV and generates alerts accordingly.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of regression based prediction of aberrant behavior in online proctoring. The present disclosure provides sequence of incident based aberrant behavior prediction during online proctoring. The present disclosure utilizes an incident tree based regression technique for prediction which is less time consuming and effective, thus providing a holistic, secured and reliable online proctoring environment.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
   receiving, by one or more hardware processors of a central assessment server, a proctoring data pertaining to each of a plurality of users from a plurality of local instances present in online exam centers;
   classifying, by the one or more hardware processors of the central assessment server, the proctoring data pertaining to each of the plurality of users based on a type of information associated with the proctoring data, using a classification technique;
   generating, by the one or more hardware processors of the central assessment server, a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes;
   computing, by the one or more hardware processors of the central assessment server, a weighted sum (X) by adding a plurality of weights associated with the weighted incident tree;
   computing, by the one or more hardware processors of the central assessment server, a dynamic path score (Y) based on a length of the weighted incident tree, a confirmation percentage, and an assessment constant,
   wherein the confirmation percentage is computed based on a weighted sum (X), a dynamic path score (Y), an assessment type value (a), an incident path deviation value (b), and a predefined threshold,
   wherein the assessment type value (a) indicates one of a) a high stake exam, and b) a low stake exam, and the assessment type value (a) is predefined before a first incident, and continuously adjusted value through a machine learning (ML) technique in accordance with feedback from the online exam center,
   wherein the incident path deviation value (b) depends upon the sequence of the incidences, the incident path deviation value (b) continuously adjusted through the ML technique in accordance with presence of incidences or absence of incidences required to compare with a fixed set of incidences available to maintain a balance in a final score;
   computing, by the one or more hardware processors of the central assessment server, an incident path matching value (b) based on a comparison between the weighted incident tree and a plurality of historic weighted incident trees stored in the command center, wherein the incident path matching value is computed based on one of a) a complete path match, and b) a partial path match;
   predicting, by the one or more hardware processors of the central assessment server, a final score for each of the plurality of users based on the weighted sum (X), the dynamic path score (Y), an assessment type value (a) and an incident path matching value (b) using an incident tree based regression technique; and
   predicting, by the one or more hardware processors of the central assessment server through an image capturing device including a Closed-Circuit Television (CCTV), an aberrant behaviour of each of the plurality of users based on a comparison between an associated final score and a plurality of predefined thresholds and is verified by the command center; and
   generating an alert message on a user interface (212) with a severity of aberrant behaviour of each of the plurality or users to an associated online proctor by the command center with corresponding colour coding, upon verifying prediction of the aberrant behavior received from the central server through the CCTV.

2. The processor implemented method of claim 1, wherein the proctoring data comprises a plurality of incidents obtained based on video footage, a plurality signal information including Radio Frequency and Bluetooth, a response behaviour of the plurality of candidates, information on a plurality of external devices further comprising keyboard, screen behaviour, and unusual system reallocation.

3. The processor implemented method of claim 1, wherein the severity of aberrant behaviour of each of the plurality of users is classified as one of high severity in a first color, a low severity in a second color, and medium severity in a third color, based on a corresponding threshold from among the plurality of thresholds.

4. The processor implemented method of claim 1, wherein the assessment type value indicates one of a) a high stake exam, and b) a low stake exam, and wherein the assessment constant is a value given to each assessment type.

5. The processor implemented method of claim 1, wherein the dynamic weight is proportional to an accuracy of the aberrant behaviour and is updated periodically.

6. A system, comprising:
a plurality of local instances connected to a central server and a command center, wherein the central server comprises:
at least one memory storing programmed instructions;
one or more Input/Output (I/O) interfaces; and
one or more hardware processors operatively coupled to the at least one memory, wherein the one or more hardware processors of the central server are configured by the programmed instructions to:
receive a proctoring data pertaining to each of a plurality of users from the plurality of local instances present in online exam centers;
classify the proctoring data pertaining to each of the plurality of users based on a type of information associated with the proctoring data, using a classification technique;
generate a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes;
compute a weighted sum (X) by adding a plurality of weights associated with the weighted incident tree;
compute a dynamic path score (Y) based on a length of the weighted incident tree, a confirmation percentage, and an assessment constant;
wherein the confirmation percentage is computed based on a weighted sum (X), a dynamic path score (Y), an assessment type value (a), an incident path deviation (b), and a predefined threshold,
wherein the assessment type value (a) indicates one of a) a high stake exam, and b) a low stake exam, and the assessment type value (a) is predefined before a first incident, and continuously adjusted value through a machine learning (ML) technique in accordance with feedback from the online exam center,
wherein the incident path deviation value (b) depends upon the sequence of the incidences, the incident path deviation value (b) continuously adjusted through the ML technique in accordance with presence of incidences or absence of incidences required to compare with a fixed set of incidences available to maintain a balance in a final score;
compute an incident path matching value (b) based on a comparison between the weighted incident tree and a plurality of historic weighted incident trees stored in the command center, wherein the incident path matching value is computed based on one of a) a complete path match, and b) a partial path match;
predict a final score for each of the plurality of users based on the weighted sum (X), the dynamic path score (Y), an assessment type value (a) and an incident path matching value (b) using an incident tree based regression technique;
predict through an image capturing device including a Closed-Circuit Television (CCTV), an aberrant behaviour of each of the plurality of users based on a comparison between an associated final score and a plurality of predefined thresholds and is verified by the command center; and
generate an alert message on a user interface (212) with a severity of aberrant behaviour of each of the plurality or users to an associated online proctor by the command center with corresponding colour coding, upon verifying prediction of the aberrant behavior received from the central server through the CCTV.

7. The system of claim 6, wherein the proctoring data comprises a plurality of incidents obtained based on video footage, a plurality signal information including Radio Frequency and Bluetooth, a response behaviour of the plurality of candidates, information on a plurality of external devices further comprising keyboard, screen behaviour, and unusual system reallocation.

8. The system of claim 6, wherein the severity of aberrant behaviour of each of the plurality of users is classified as one of high severity in a first color, a low severity in a second color, and medium severity in a third color, based on a corresponding threshold from among the plurality of thresholds.

9. The system of claim 6, wherein the assessment constant is a value given to each assessment type.

10. The system of claim 6, wherein the dynamic weight is proportional to an accuracy of the aberrant behaviour and is updated periodically.

11. One or more non-transitory machine-readable information storage mediums comprising one or more instructions which when executed causes:
receiving, by one or more hardware processors of a central assessment server, a proctoring data pertaining to each of a plurality of users from a plurality of local instances present in online exam centers;
classifying, by the one or more hardware processors of the central assessment server, the proctoring data pertaining to each of the plurality of users based on a type of information associated with the proctoring data, using a classification technique;
generating, by the one or more hardware processors of the central assessment server, a weighted incident tree corresponding to each of the plurality of users based on a corresponding classified proctoring data using a tree construction technique, wherein each node of the weighted incident tree represents an incident and an associated dynamic weight, and wherein an edge connecting two adjacent nodes indicates a relationship between the two adjacent nodes;
computing, by the one or more hardware processors of the central assessment server, a weighted sum (X) by adding a plurality of weights associated with the weighted incident tree;
computing, by the one or more hardware processors of the central assessment server, a dynamic path score (Y) based on a length of the weighted incident tree, a confirmation percentage, and an assessment constant, wherein the confirmation percentage is computed based on a weighted sum (X), a dynamic path score (Y), an assessment type value (a), an incident path deviation value (b), and a predefined threshold, wherein the assessment type value (a) indicates one of a) a high stake exam, and b) a low stake exam, and the assessment type value (a) is predefined before a first incident, and continuously adjusted value through a machine learning (ML) technique in accordance with feedback from the online exam center, wherein the incident path deviation value (b) depends upon the sequence of the incidences, the incident path deviation value (b) continuously adjusted through the ML technique in accordance with presence of incidences or absence of incidences required to compare with a fixed set of incidences available to maintain a balance in a final score;

computing, by the one or more hardware processors of the central assessment server, an incident path matching value (b) based on a comparison between the weighted incident tree and a plurality of historic weighted incident trees stored in the command center, wherein the incident path matching value is computed based on one of a) a complete path match, and b) a partial path match;

predicting, by the one or more hardware processors of the central assessment server, a final score for each of the plurality of users based on the weighted sum (X), the dynamic path score (Y), an assessment type value (a) and an incident path matching value (b) using an incident tree based regression technique;

predicting, by the one or more hardware processors of the central assessment server through an image capturing device including a Closed-Circuit Television (CCTV), an aberrant behaviour of each of the plurality of users based on a comparison between an associated final score and a plurality of predefined thresholds and is verified by the command center; and generating an alert message on a user interface (212) with a severity of aberrant behaviour of each of the plurality or users to an associated online proctor by the command center with corresponding colour coding, upon verifying prediction of the aberrant behavior received from the central server through the CCTV.

12. The one or more non-transitory machine-readable information storage mediums of claim 11, wherein the one or more instructions which when executed by the one or more hardware processors further cause keyboard, screen behaviour, and unusual system reallocation.

13. The one or more non-transitory machine-readable information storage mediums of claim 11, wherein the severity of aberrant behaviour of each of the plurality of users is classified as one of high severity in a first color, low severity in a second color, and a medium severity in a third color, based on a corresponding threshold from among the plurality of thresholds.

14. The one or more non-transitory machine-readable information storage mediums of claim 11, wherein the assessment constant is a value given to each assessment type.

* * * * *